United States Patent
Greywall

(10) Patent No.: US 7,842,923 B2
(45) Date of Patent: Nov. 30, 2010

(54) THERMAL ACTUATOR FOR AN INFRARED SENSOR

(75) Inventor: Dennis S. Greywall, Lexington, VA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 304 days.

(21) Appl. No.: 12/180,866

(22) Filed: Jul. 28, 2008

(65) Prior Publication Data

US 2010/0020383 A1    Jan. 28, 2010

(51) Int. Cl.
*G01J 5/00* (2006.01)

(52) U.S. Cl. .................................................. 250/338.1

(58) Field of Classification Search .... 250/338.1–338.5
See application file for complete search history.

(56) References Cited

U.S. PATENT DOCUMENTS

| | | | | |
|---|---|---|---|---|
| 3,384,749 | A | 5/1968 | Golay | 250/472.1 |
| 4,306,150 | A | 12/1981 | Dietz | 250/332 |
| 5,501,893 | A | 3/1996 | Laermer et al. | |
| 5,629,790 | A | 5/1997 | Neukermans et al. | |
| 5,739,538 | A | 4/1998 | Sakaue et al. | 250/345 |
| 6,080,988 | A | 6/2000 | Ishizuya et al. | 250/338.1 |
| 6,201,631 | B1 | 3/2001 | Greywall | |
| 6,367,252 | B1 | 4/2002 | Hill et al. | 60/528 |
| 6,667,823 | B2 | 12/2003 | Greywall | |
| 6,734,597 | B1 | 5/2004 | Howell et al. | 310/306 |
| 6,806,991 | B1 | 10/2004 | Sarkar et al. | 359/290 |
| 6,850,354 | B2 | 2/2005 | Greywall | |
| 6,869,169 | B2 | 3/2005 | Cabal et al. | 347/56 |
| 6,876,484 | B2 | 4/2005 | Greywall | |
| 6,900,440 | B2 * | 5/2005 | Reed et al. | 250/338.1 |
| 6,924,581 | B2 | 8/2005 | Greywall | |
| 6,980,339 | B2 | 12/2005 | Greywall et al. | |
| 6,995,895 | B2 | 2/2006 | Greywall | |
| 7,011,288 | B1 | 3/2006 | Slicker et al. | 251/11 |
| 7,099,063 | B2 | 8/2006 | Greywall | |
| 7,541,585 | B2 * | 6/2009 | Massoni et al. | 250/338.4 |
| 2002/0153486 | A1 | 10/2002 | Ishizuya et al. | 250/338.1 |
| 2003/0089865 | A1 | 5/2003 | Eldridge | 251/11 |

(Continued)

OTHER PUBLICATIONS

Dennis Greywall, U.S. Appl. No. 11/531,011, filed Sep. 12, 2006.

(Continued)

*Primary Examiner*—David P Porta
*Assistant Examiner*—Kiho Kim
(74) *Attorney, Agent, or Firm*—Mendelsohn, Drucker & Associates, P.C.; Yuri Gruzdkov; Steve Mendelsohn

(57) ABSTRACT

In one embodiment, an infrared (IR) sensor has a flexible beam connected between two anchors supported on a substrate. The beam is mechanically coupled to a plate that has an IR-absorbing layer and is adapted to transfer the IR-induced heat to the beam. The heat transfer causes the beam to deform and move the plate with respect to the substrate. The motion of the plate is detected electrically or optically to quantify the amount of IR radiation received by the plate. The beam, anchors, and plate are formed from a planar layer of material that is supported at a specified offset distance from the substrate. During fabrication, certain portions of the planar layer are removed to define the beam, anchors, and plate.

20 Claims, 7 Drawing Sheets

U.S. PATENT DOCUMENTS

| | | | |
|---|---|---|---|
| 2003/0099082 A1 | 5/2003 | Tuo et al. | 361/290 |
| 2003/0111603 A1 | 6/2003 | Sone et al. | 250/338.1 |
| 2005/0229710 A1 | 10/2005 | O'Dowd et al. | 73/718 |
| 2006/0152105 A1 | 7/2006 | Aksyuk et al. | 310/307 |
| 2006/0158484 A1 | 7/2006 | Greywall | |
| 2006/0228896 A1 | 10/2006 | Greywall | |

OTHER PUBLICATIONS

Vladimir Anatolyevich Aksyuk, U.S. Appl. No. 11/766,430, filed Jun. 21, 2007.

Vladimir Anatolyevich Aksyuk, U.S. Appl. No. 11/766,414, filed Jun. 21, 2007.

U.S. Appl. No. 11/713,207, filed Mar. 2, 2007.

"High Sensitivity Uncooled Microcantilever Infrared Imaging Arrays," by Scott R. Hunter et al., Infrared Technology and Applications XXIX, Bjørn F. Andresen, Gabor F. Fulop, Editors, Proceedings of SPIE vol. 5074, 2003, pp. 469-480.

"Optomechanical Uncooled Infrared Imaging System," by Yang Zhao, Dissertation, University of California, Berkeley, Fall 2002, pp. 1-155.

"Design and Fabrication of a Novel Bimorph Microoptomechanical Sensor," by Si-Hyung Lim et al., Journal of Microelectromechanical Systems, vol. 14, No. 4, Aug. 2005, pp. 683-690.

"Infrared Vision Using Uncooled Optomechanical Camera" by A. Majumdar et al., Proceedings of SPIE, vol. 3948, (2000), 0277-786X/00, pp. 74-79.

"'Self-Leveling' Uncooled Microcantilever Thermal Detector," by J.L. Corbeil et al., Applied Physics Letters, vol. 81, No. 7, Aug. 12, 2002, American Institute of Physics, pp. 1306-1308.

"Solid State Optical Thermal Imagers," Matthias Wagner et al., Infrared Technologies and Applications XXXIII, Proc. of SPIE, vol. 6542, 65421P, (2007) 0277-786X/07, 10 pages.

"Uncooled Infrared Imaging Using Bitmaterial Microcantilever Arrays," N.V. Lavrik et al., Infrared Technology and Applications XXXII, Proc. of SPIE vol. 6206, 62061K, (2006) 0277-786X/06, 8 pages.

"Optically Readable Bi-Material Infrared Detector," by Tohru Ishizuya et al., Infrared Technology and Applications XXVII, Proceedings of SPIE vol. 4369 (2001), pp. 342-349.

"Uncooled MEMS IR Imagers with Optical Readout and Image Processing," by Nickolay Lavrik et al., Infrared Technology and Applications XXXIII, Proc. of SPIE vol. 6542, 65421E, (2007), 8 pages.

"High Sensitivity Photomechanical MW-LWIR Imaging Using an Uncooled MEMS Microcantilever Array and Optical Readout," by J. Zhao, Infrared Technology and Applications XXXI, Proc. of SPIE vol. 5783, 2005, pp. 506-513.

"High Frame Rate Imaging Using Uncooled Optical Readout Photochemical IR Sensor," by Jack P. Salerno, Infrared Technology and Applications XXXIII, Proc. of SPIE vol. 6542, 65421D, (2007), (9 pages).

"160×120 Pixels Optically Readable Bimaterial Infrared Detector," by Tohru Ishizuya et al., Nikon Corporation, Photonics Technology Department, Core Technology Center, IEEE 0-7803-71/85-2/02, 2002, pp. 578-581.

* cited by examiner

200

300

300

INFRARED RADIATION

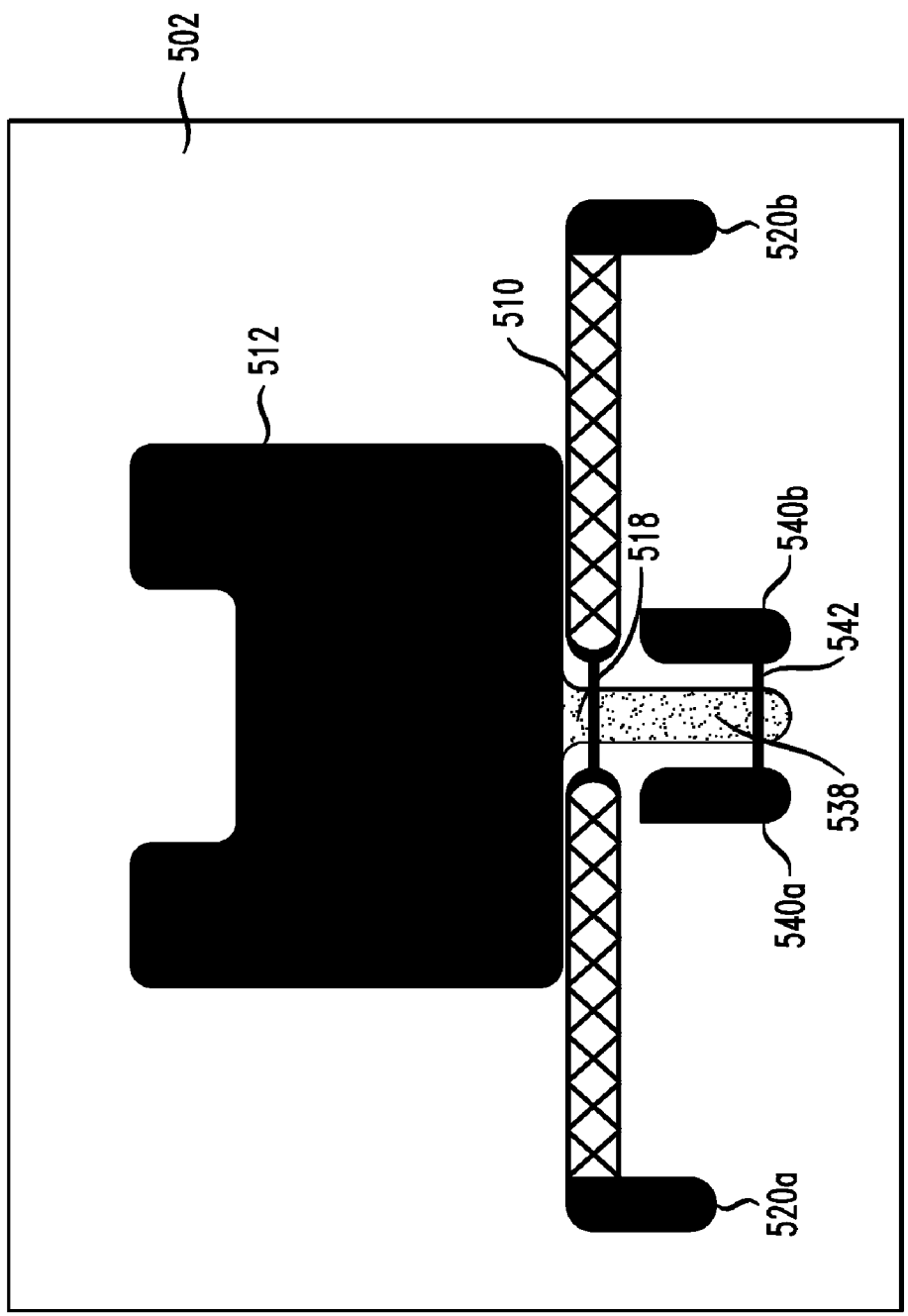

600

THERMAL ACTUATOR FOR AN INFRARED SENSOR

CROSS-REFERENCE TO RELATED APPLICATIONS

This application is related to (i) U.S. patent application Ser. No. 11/036,264, filed Jan. 14, 2005, and entitled "Thermal Actuator for a MEMS Device;" (ii) U.S. patent application Ser. No. 11/531,011, filed Sep. 12, 2006, and entitled "Pneumatic Infrared Detector;" (iii) U.S. patent application Ser. No. 11/766,430, filed Jun. 21, 2007, and entitled "Infrared Imaging Apparatus;" and (iv) U.S. patent application Ser. No. 11/766,414, filed Jun. 21, 2007, and entitled "Detector of Infrared Radiation Having a Bi-Material Transducer," each of which is incorporated herein by reference in its entirety.

BACKGROUND OF THE INVENTION

1. Field of the Invention

The present invention relates to detectors of infrared radiation and infrared imaging systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Infrared (IR) detectors are classified into two categories: photonic and thermal. In a photonic IR detector, infrared photons are absorbed to excite electronic transitions and/or generate photocurrent within an IR absorber, usually a semiconductor material having an appropriate bandgap. The excitation changes material properties of the IR absorber such as, for example, electrical conductivity. This change is measured to quantify the amount of absorbed IR radiation. Photonic IR detectors usually operate at very low temperatures, e.g., about 78 K, to suppress thermally induced electronic transitions and/or thermal "dark" current in the IR absorber. As such, photonic IR detectors often utilize cryostats and/or complex cooling systems, which make these detectors heavy, bulky, and relatively expensive.

In a thermal IR detector, the energy of absorbed infrared photons is converted into heat, which causes a temperature increase within the detector. This temperature increase is converted into a mechanical or electrical response, which is measured to quantify the amount of absorbed IR radiation. A sensor employed in a thermal IR detector typically has (i) a resistive bolometer, whose electrical resistance changes with temperature, (ii) a pyroelectric material, which exhibits a spontaneous electric polarization change with temperature, (iii) a thermocouple, whose voltage depends on the thermocouple's temperature differential, and/or (iv) a bi-material (also referred to as bimorph) cantilever, whose shape is sensitive to temperature changes.

Unlike photonic IR detectors, thermal IR detectors typically (i) do not use cooling and (ii) can operate at temperatures normally present in the environment, e.g., about 300 K. As a result, thermal IR detectors can be light, compact, and relatively inexpensive. Accordingly, thermal IR detectors and infrared imaging systems employing such detectors are being actively developed.

SUMMARY OF THE INVENTION

In one embodiment, an infrared (IR) sensor of the invention has a flexible beam connected between two anchors supported on a substrate. The beam is mechanically coupled to a plate that has an IR-absorbing layer and is adapted to transfer the IR-induced heat to the beam. The heat transfer causes the beam to deform and move the plate with respect to the substrate. The motion of the plate is detected electrically or optically to quantify the amount of IR radiation received by the plate. The beam, anchors, and plate are formed from a planar layer of material that is supported at a specified offset distance from the substrate. During fabrication, certain portions of the planar layer are removed to define the beam, anchors, and plate. Advantageously, the IR sensor is relatively insensitive to variations in ambient temperature, has a relatively high sensitivity to IR radiation, and lends itself to incorporation into a sensor array suitable for detection of IR images.

According to one embodiment, a device of the invention has a substrate and a first flexible beam connected between two anchors supported on the substrate. The device further has a plate mechanically coupled to the first flexible beam and adapted to absorb incident radiation. The plate is adapted to transfer heat generated due to said absorption to the first flexible beam to cause the first flexible beam to deform and move the plate with respect to the substrate. The first flexible beam and at least a portion of each of the two anchors have been formed from a common layer of material.

According to another embodiment, a method of detecting incident radiation has the step of exposing a plate to the incident radiation, wherein the plate is adapted to absorb at least a portion of said radiation. The method further has the step of transferring heat generated in the plate due to said absorption to a first flexible beam to cause the first flexible beam to deform and move the plate with respect to the substrate. The first flexible beam is connected between two anchors supported on a substrate. The plate is mechanically coupled to the first flexible beam. The first flexible beam and at least a portion of each of the two anchors have been formed from a common layer of material. The method further has the step of detecting the motion of the plate.

BRIEF DESCRIPTION OF THE DRAWINGS

Other aspects, features, and benefits of the present invention will become more fully apparent from the following detailed description, the appended claims, and the accompanying drawings in which:

FIGS. 5A-B show top and three-dimensional perspective views, respectively, of an IR sensor according to yet another embodiment of the invention.

DETAILED DESCRIPTION

Figure 1A:
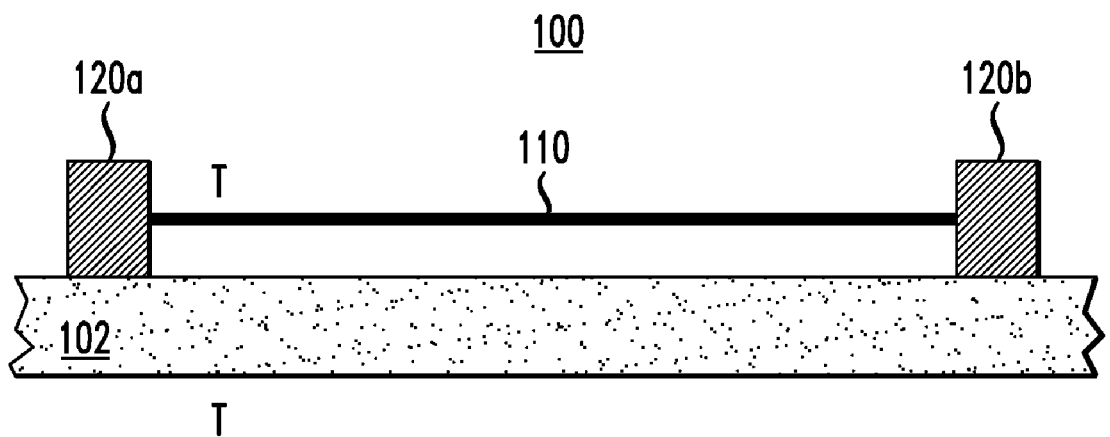
FIGS. 1A-B show cross-sectional side views of a thermal actuator according to one embodiment of the invention.
Figure 1B:
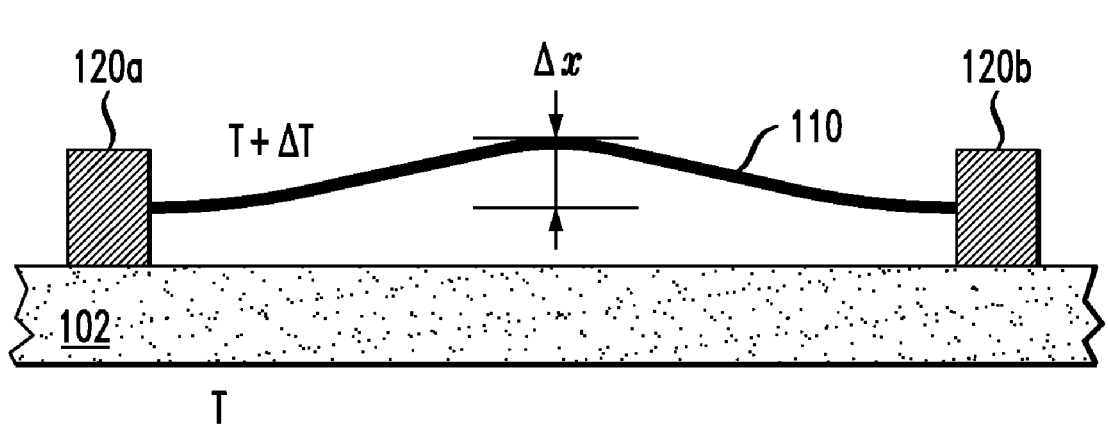

FIGS. 1A-B show cross-sectional side views of a thermal actuator 100 according to one embodiment of the invention. Actuator 100 has a flexible beam 110 that is attached between two anchors 120a-b affixed to a substrate 102. At temperature T, beam 110 has a first shape, e.g., a straight shape shown in FIG. 1A. If the temperature of beam 110 is elevated by ΔT, then the length of beam 110 increases due to thermal expansion. If substrate 102 remains at temperature T, then the substrate does not expand and the distance between anchors 120a-b remains unchanged. At a relatively large ΔT, the thermal expansion of beam 110 causes the beam to buckle, e.g., as shown in FIG. 1B, and adopt a second shape. The buckling of beam 110 generates a displacement of the beam's midsection, which enables actuator 100 to convert heat into mechanical movement. The magnitude of the displacement (Δx, see FIG. 1B) is related to ΔT.

In one embodiment, beam 110 is placed in thermal contact with an IR absorber (not explicitly shown in FIG. 1). Provided that anchors 120a-b are designed to conduct heat relatively poorly, the heat generated by the absorption of IR radiation in the IR absorber will produce temperature difference ΔT between beam 110 and substrate 102. The resulting displacement of the midsection of beam 110 can then be measured to quantify the amount of IR radiation received by the IR absorber.

Figure 2:
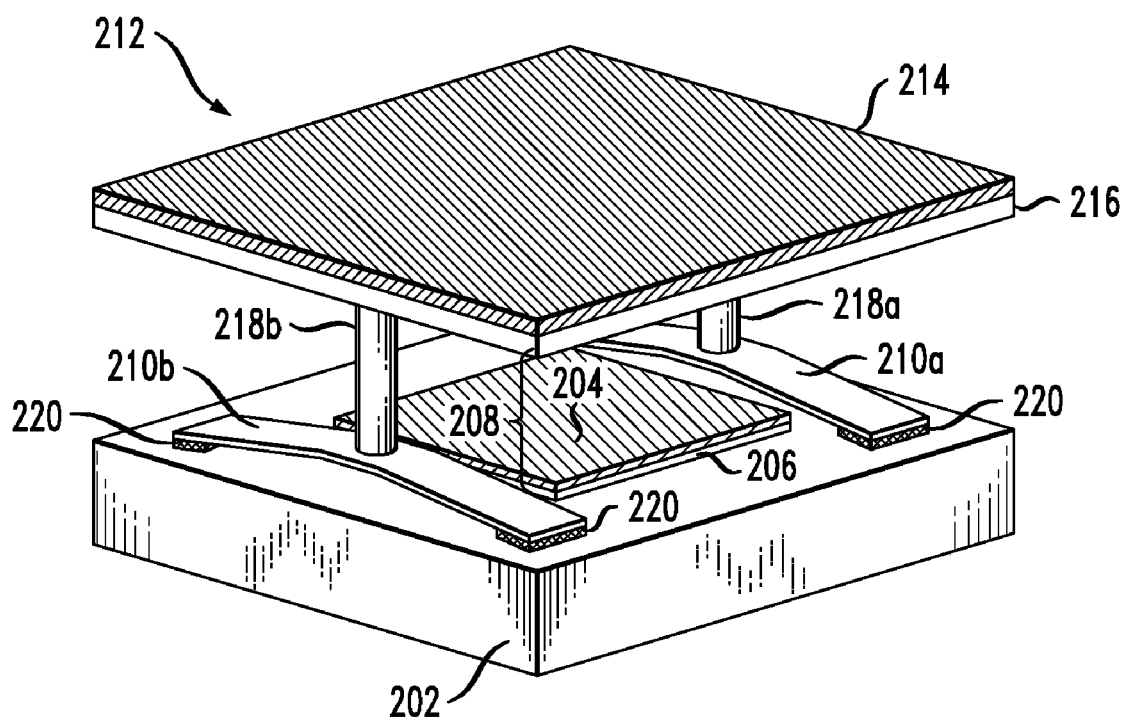
FIG. 2 shows a three-dimensional perspective view of an IR sensor according to one embodiment of the invention.

FIG. 2 shows a three-dimensional perspective view of an IR sensor 200 according to one embodiment of the invention. Sensor 200 has two thermal actuators analogous to thermal actuator 100 of FIG. 1. More specifically, each of the two thermal actuators of sensor 200 includes a flexible beam 210, which is attached between two anchors 220 affixed to a substrate 202. However, one difference between beam 210 of sensor 200 and beam 110 of actuator 100 is that beam 210 has a slightly arched shape at the intended operating temperature even in the absence of IR radiation. The arched shape of beam 210 removes an uncertainty with respect to the buckling direction inherent to the straight shape of beam 110 and causes beam 210 to buckle outward with respect to substrate 202.

Sensor 200 further has a plate 212 connected to beams 210a-b by supports 218a-b, respectively. In one embodiment, plate 212 includes two layers of material: an IR-absorbing layer 214 and a base layer 216. When layer 214 is subjected to IR irradiation, the temperature of plate 212 rises. Due to the thermal contact between plate 212 and beams 210a-b provided by supports 218a-b, heat is transferred from the plate to the beams, which causes the beams to buckle and move the plate.

To detect motion of plate 212, sensor 200 has an electrode 204 attached to substrate 202 and electrically insulated from the substrate by a dielectric layer 206. Electrode 204 and base layer 216 of plate 212 form a parallel-plate capacitor 208 whose capacitance depends on the distance between the plate and the electrode. As such, change in the position of plate 212 can be measured by measuring the changing capacitance of capacitor 208. The measured capacitance change can then be related to the temperature of plate 212 and/or amount of IR radiation received by the plate. For additional details on actuator 100 and sensor 200, the reader is referred to the above-cited U.S. patent application Ser. No. 11/036,264.

Figure 3A:
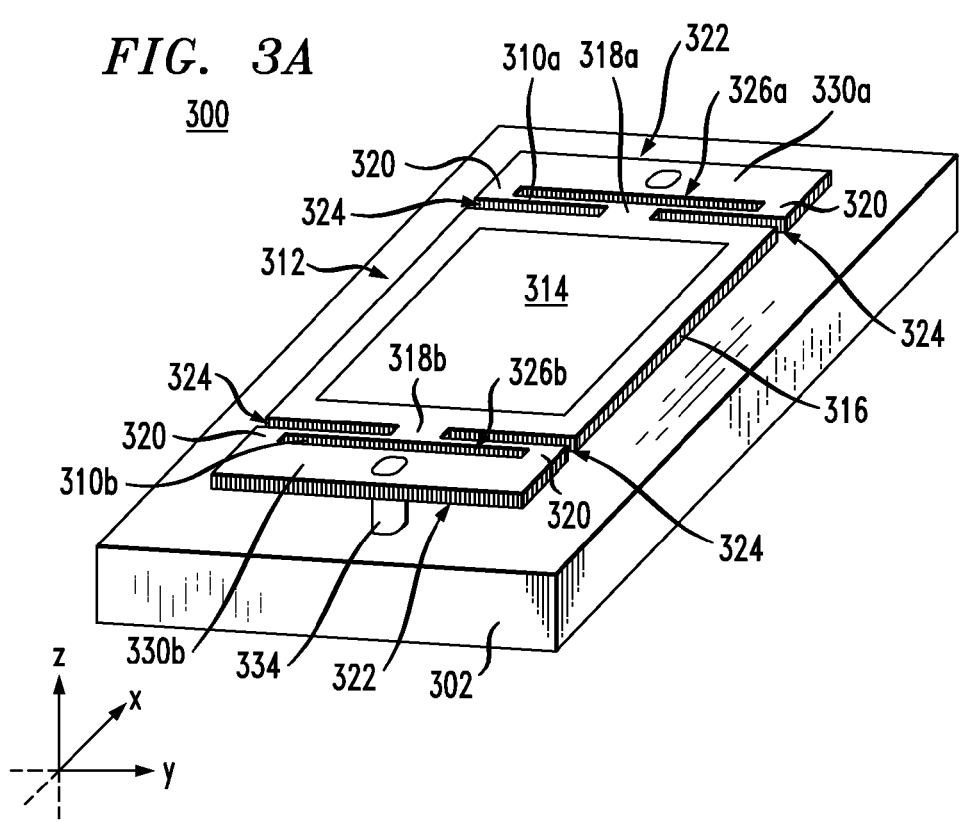
FIGS. 3A-B show three-dimensional perspective views of an IR sensor according to another embodiment of the invention.
Figure 3B:
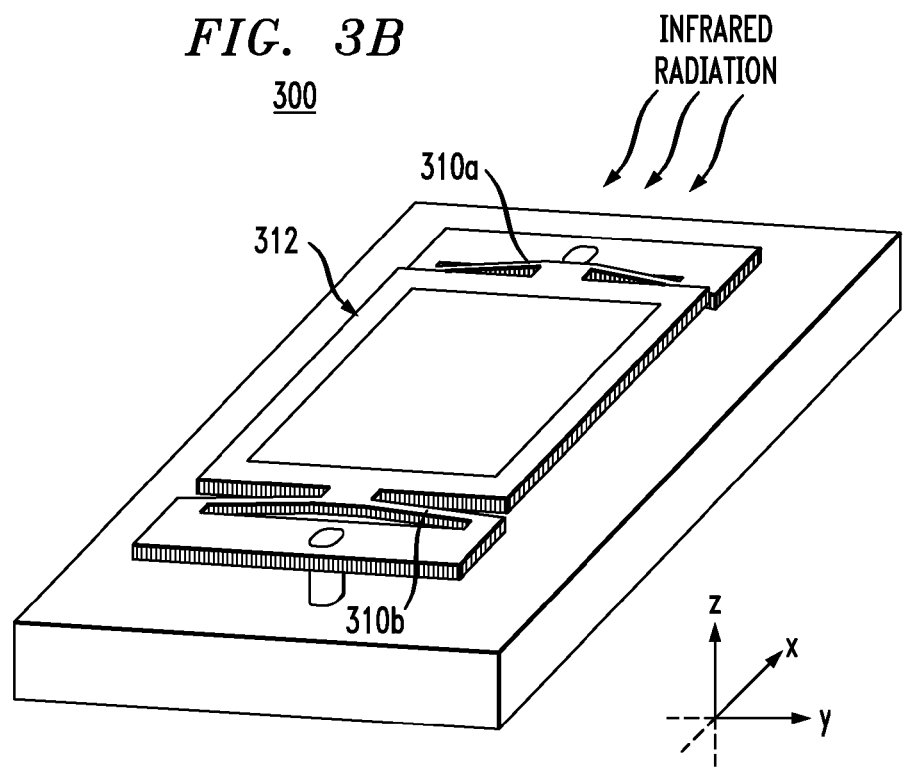

FIGS. 3A-B show three-dimensional perspective views of an IR sensor 300 according to another embodiment of the invention. Sensor 300 is generally analogous to sensor 200 (FIG. 2) and analogous elements of the two sensors are designated with labels having the same last two digits. However, there are certain differences between sensors 300 and 200, which are explained in more detail below.

Sensor 300 differs from sensor 200 in that beams 310a-b, anchors 320, fasteners 330, base layer 316 of plate 312, and supports 318a-b are all formed using the same layer of material, which layer is labeled 322. Standoff pillars 334 support layer 322 at a specified offset distance from substrate 302. In an undeformed state, layer 322 is a substantially planar layer that is parallel to substrate 302. During fabrication, certain portions of layer 322 are removed to define the corresponding elements of sensor 300. For example, four cutouts 324 in layer 322 define supports 318a-b and the edges of plate 312 to which those supports are attached. Cutouts 324 together with slots 326a-b etched through layer 322 further define beams 310a-b, fasteners 330a-b, and four anchors 320. Each fastener 330 is a stripe of material that ties two respective anchors 320 and is attached to the corresponding standoff pillar 334.

FIG. 3A shows sensor 300 when there are no temperature gradients in the sensor. In particular, beams 310a-b and fasteners 330a-b are at the same temperature, which results in layer 322 being substantially flat and the various structural elements defined in that layer lying in a single plane. If IR-absorbing layer 314 of plate 312 is heated by impinging IR radiation, then the heat flow from the plate, through supports 318a-b, to beams 310a-b causes the temperature of the beams to rise. At the same time, the topology of beams 310a-b (which have a relatively small cross-section and a relatively large length) and the presence of slots 326a-b inhibit significant heat flow from the beams to fasteners 330a-b, which leads to a temperature difference between the beams and the fasteners. The higher temperature of beams 310 compared to that of fasteners 330 causes the beams to buckle, e.g., as shown in FIG. 3B. The buckling of beams 310a-b moves plate 312 with respect to substrate 302. If beams 310a-b have similar mechanical properties, then the motion of plate 312 is a translation along a Z direction, during which the plate remains substantially parallel to substrate 302.

As already explained above, the initial straight shape of beam 310 can create an uncertainty regarding the buckling direction of the beam. However, a small stress gradient that can be built into layer 322, as known in the art, can remove that uncertainty and favor one buckling direction over the other. For example, if layer 322 is manufactured so that the built-in stress across that layer increases in the positive Z direction, then IR radiation received by plate 312 will cause beams 310a-b to buckle in the positive Z direction as well (as shown in FIG. 3B). On the other hand, if layer 322 is manufactured so that the built-in stress across layer 322 decreases in the positive Z direction, then IR radiation received by plate 312 will cause beams 310a-b to buckle in the negative Z direction.

Alternatively, layer 322 can be fabricated to be substantially stress-gradient free. Then, an additional thin layer of a different material (not explicitly shown in FIG. 3) can be deposited over the portion of layer 322 corresponding to beam 310. It is known in the art that differences in thermal expansion coefficients typically cause a contact region between two dissimilar materials to have a stress gradient. This contact-region stress gradient will remove the buckling-direction uncertainty and favor one buckling direction over the other in a manner similar to the above-described case of layer 322 fabricated with a built-in stress gradient.

In one embodiment, sensor 300 incorporates an electrode (not explicitly shown) similar to electrode 204 of sensor 200 to enable electrical detection of changes in the position of plate 312 with respect to substrate 302. In an alternative embodiment, sensor 300 can be adapted for optical interrogation to enable optical detection of the same. More specifically, the motion and/or displacement of plate 312 can be used to impart a corresponding phase shift onto an interrogating optical beam that is reflected from the plate. This phase shift can then be detected, as known in the art, and used to quantify the displacement of plate 312 with respect to a reference position. More details on optical interrogation of IR sensors can be found, e.g., in the above-cited U.S. patent application Ser. Nos. 11/531,011, 11/766,414, and 11/766,430.

The above-described features of sensor 300 enable certain embodiments of the sensor to be relatively insensitive to ambient temperature fluctuations and to respond substantially only to a temperature difference between beam 310 and the corresponding fastener 330. Thus, sensor 300 might be used in applications where the sensor can be subjected to a relatively wide range of ambient temperatures.

In one embodiment, sensor 300 can be fabricated using the following set of materials: (i) amorphous hydrogenated silicon carbide for substrate 302, layer 322, and standoff pillars 334; and (ii) Ti/W alloy for layer 314. One skilled in the art will appreciate that other appropriate materials can similarly be used.

In one embodiment, sensor 300 has the following dimensions: (i) between about 10 to a few hundred microns for the length and width of plate 312 and the length of beam 310; (ii) between about 1 and 5 micron for the width of beam 310; (iii) about 0.5 micron for the gap between substrate 302 and layer 322; (iv) between about 0.1 and 0.5 micron for the thickness of beam 310; (v) about 0.1 micron for the thickness of layer 314; and (vi) about 0.5 micron for the thickness of plate 312.

Figure 4:
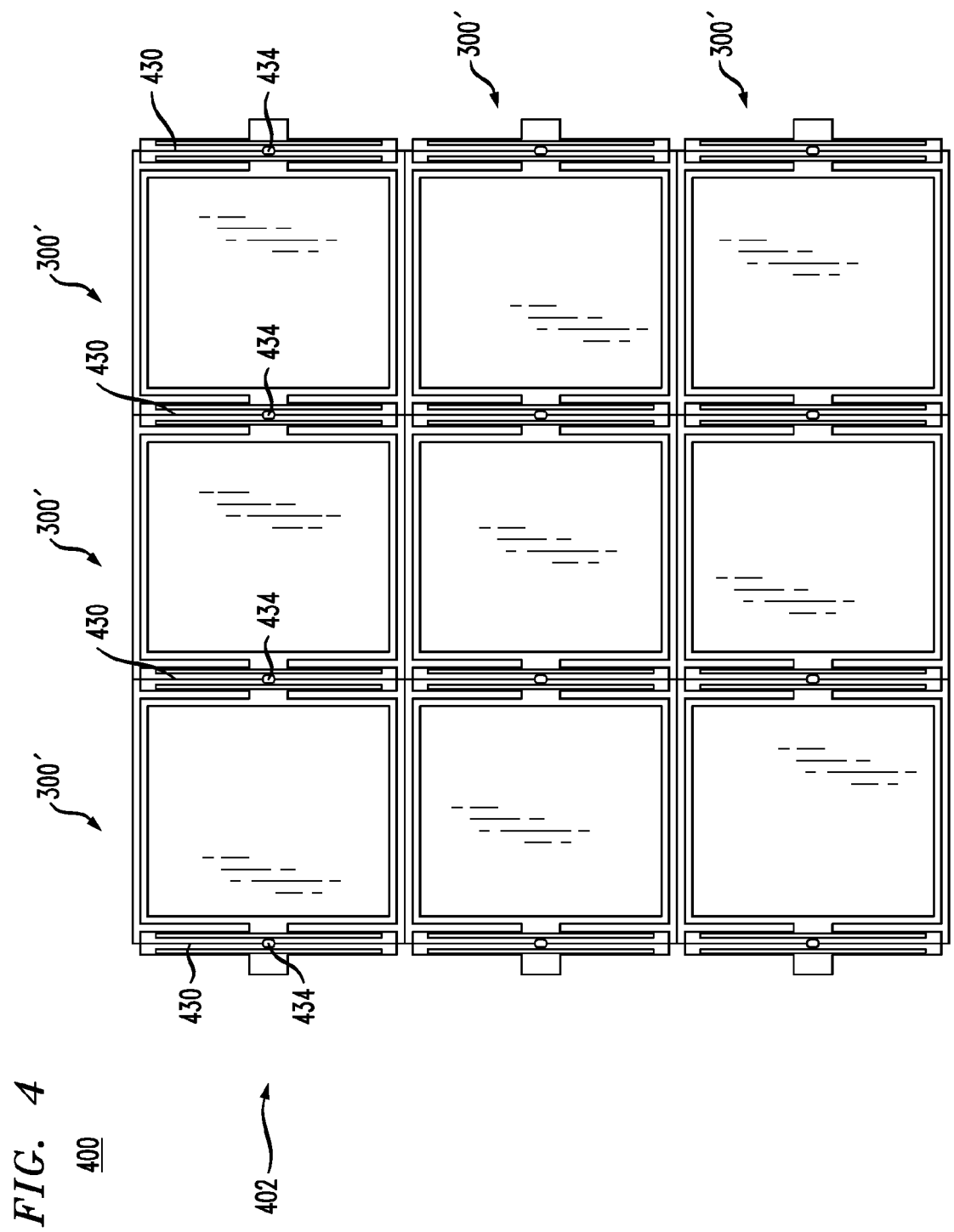
FIG. 4 shows a top view of an arrayed IR sensor according to one embodiment of the invention.

FIG. 4 shows a top view of an arrayed IR sensor 400 according to one embodiment of the invention. Array 400 is illustratively shown as having nine sensors 300' arranged in three rows and three columns. One skilled in the art will appreciate that a different number of sensors 300' can similarly be arrayed to form a relatively large (e.g., ~1000-pixel) array suitable for detection of IR images.

Each of sensors 300' is similar to sensor 300 of FIG. 3, except that sensors 300' belonging to the same row, e.g., row 402, share some structural elements. For example, two adjacent sensors 300' in row 402 have a common standoff pillar 434, which is otherwise analogous to standoff pillar 334 of FIG. 3. Two adjacent sensors 300' in row 402 further have a common fastener 430, which is otherwise analogous to fastener 330 of FIG. 3. Advantageously, the structural-element sharing implemented in array 400 can be used to reduce the overall complexity of the array.

Figure 5B:
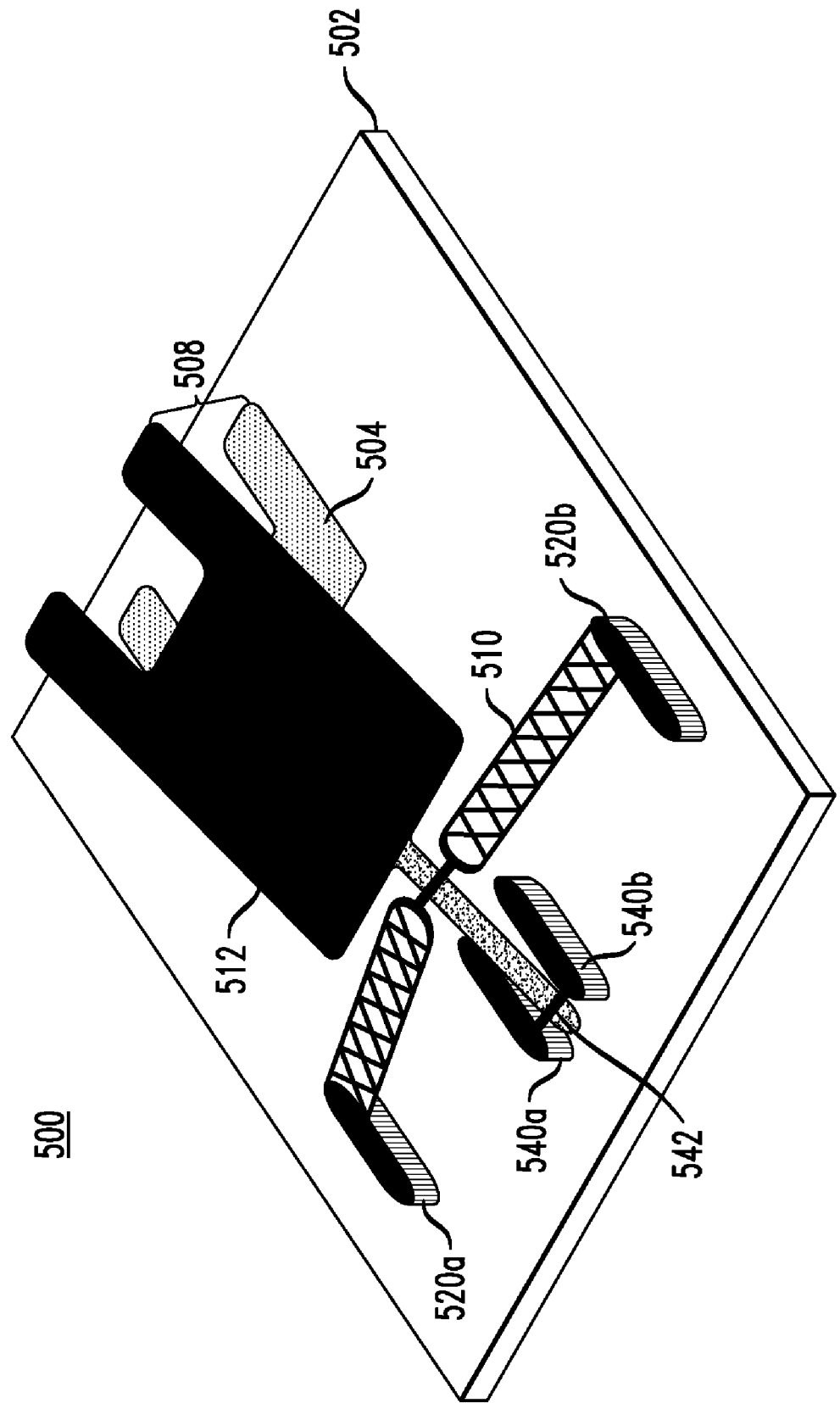

FIGS. 5A-B show an IR sensor 500 according to yet another embodiment of the invention. More specifically, FIG. 5A shows a top view of sensor 500. FIG. 5B shows a three-dimensional perspective view of sensor 500 when the sensor is heated by IR radiation.

Sensor 500 has a flexible beam 510, which is attached between two anchors 520a-b affixed to a substrate 502. Sensor 500 further has a plate 512 connected to beam 510 by a heat-conducting bridge 518. An extension 538 of bridge 518 further connects plate 512 to a torsion rod 542 that is attached between two anchors 540a-b. Similar to anchors 520, anchors 540 are affixed to substrate 502. In one embodiment, plate 512, bridge 518, extension 538, rod 542, and top portions of anchors 520 and 540 are all formed from the same layer of material that is analogous to layer 322 of sensor 300 (see FIG. 3).

If plate 512 is subjected to IR irradiation, then the heat generated therein flows from the plate, through bridge 518, to beam 510, thereby creating a temperature gradient between the beam and substrate 502. The temperature gradient causes beam 510 to buckle, which in turn causes extension 538 to pivot about torsion rod 542. Bridge 518 transfers the pivoting motion of extension 538 to plate 512 to tilt the plate as shown in FIG. 5B.

The position of plate 512 with respect to substrate 502 is detected electrically, e.g., by measuring the capacitance of a capacitor 508 formed by the plate and a C-shaped electrode 504 disposed on substrate 502 (see FIG. 5B). Electrode 504 generally follows the outline of the far (with respect to beam 510) side of plate 512 and is located beneath the free end of the lever formed by extension 538, bridge 518, and plate 512. The lever amplifies displacement $\Delta x$ of the midsection of beam 510 (see also FIG. 1B) at the lever's free end. As a result, capacitor 508 is capable of producing higher relative capacitance changes than, e.g., capacitor 208 (FIG. 2), under otherwise comparable conditions. This property of sensor 500 can advantageously be used to implement a system having a relatively high sensitivity to IR radiation.

Figure 6:
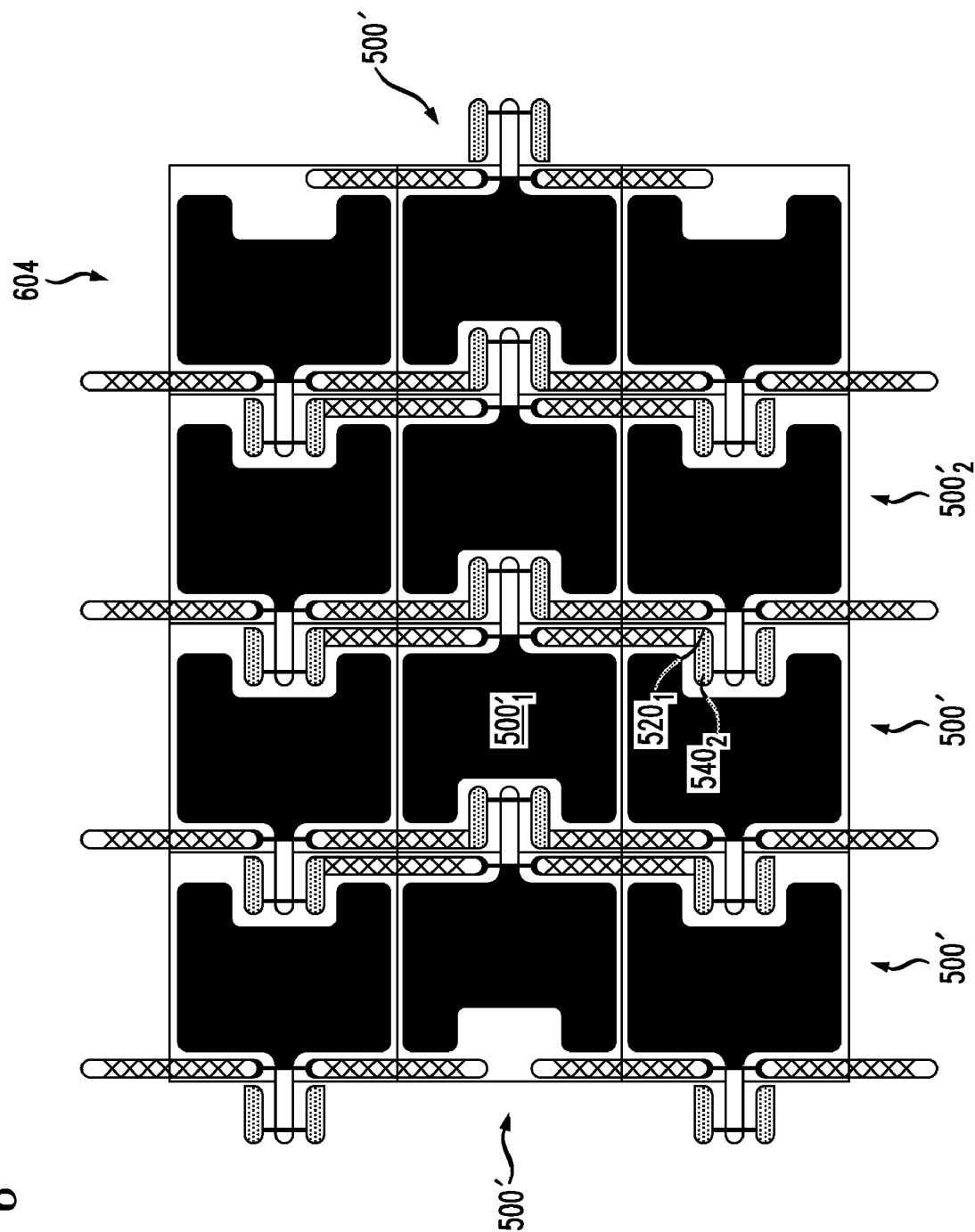
FIG. 6 shows a top view of an arrayed IR sensor according to another embodiment of the invention.

FIG. 6 shows a top view of an arrayed IR sensor 600 according to another embodiment of the invention. Array 600 is illustratively shown as having twelve sensors 500' arranged in three rows and four columns. Each of sensors 500' is similar to sensor 500 of FIG. 5, except that sensors 500' share some structural elements. For example, anchor 520 of one sensor 500' might also serve as anchor 540 for another sensor 500' (see also FIG. 5). For example, anchor $520_1$ of sensor $500_1'$ serves as anchor $540_2$ for another sensor $500_2'$ (see FIG. 6).

Inspection of FIG. 6 reveals that array 600 has the following features. Sensors 500' belonging to the same column, e.g., column 604, are arranged so that plates 512 of different sensors 500' form a substantially contiguous segmented plate having independently movable segments. This feature enables array 600 to have a relatively high (e.g., >95%) IR-radiation fill factor. Both the distance between two anchors 520 corresponding to the same beam 510 and the length of that beam are greater (e.g., by a factor of about two or more) than the linear size of plate 512. One skilled in the art will appreciate that the relatively large lengths of beams 510 enable array 600 to produce relatively large displacements $\Delta x$ (see also FIG. 1B), which is beneficial in terms of sensitivity to IR radiation. Plates 520 of sensors 500' belonging to adjacent rows pivot in opposite directions. Plates 512, bridges 518, extensions 538, rods 542, and top portions of anchors 520 and 540 corresponding to different sensors 500' can all be formed from the same layer of material supported on a common substrate. This feature helps to simplify the fabrication process for array 600.

Sensors and arrays of the invention can be implemented as MEMS devices and fabricated, e.g., using layered wafers as described in commonly owned U.S. Pat. Nos. 6,850,354 and 6,924,581, which are incorporated herein by reference in their entirety. Various layers of material can be deposited onto a wafer using, e.g., chemical vapor deposition. Various parts of the devices can be mapped onto the corresponding layers using lithography. Additional description of various fabrication steps can be found, e.g., in U.S. Pat. Nos. 6,201,631, 5,629,790, and 5,501,893, all of which are incorporated herein by reference in their entirety. Representative fabrication-process flows can be found, e.g., in U.S. Pat. Nos. 6,667,823, 6,876,484, 6,980,339, 6,995,895, and 7,099,063 and U.S. patent application Ser. No. 11/095,071 (filed on Mar. 31, 2005), all of which are incorporated herein by reference in their entirety.

As used in this specification, the term infrared radiation covers all of the following spectral bands: (1) visible to near IR, wavelengths from about 400 nm to about 1 μm; (2) short-wave IR, wavelengths from about 1 μm to about 3 μm; (3) midwave IR, wavelengths from about 3 μm to about 7 μm; and (4) long-wave IR, wavelengths from about 7 μm to about 14 μm.

While this invention has been described with reference to illustrative embodiments, this description is not intended to be construed in a limiting sense. Although sensors of the invention were described in reference to IR radiation, one skilled in the art will appreciate that these sensors can also be adapted to detect other types of radiation, e.g., ultraviolet or corpuscular, provided that the radiation can be converted into heat upon absorption in the plate of the sensor. Various surfaces may be modified, e.g., by metal deposition for enhanced reflectivity, IR absorption, and/or electrical conductivity, or by ion implantation for enhanced mechanical strength. Differently shaped levers, anchors, plates, pillars, posts, supports, bridges, extensions, flexible beams, and/or electrodes may be implemented without departing from the scope and principle of the invention. Sensors of the invention can be variously arrayed to form linear or two-dimensional arrays. Interrogating light can be of any suitable wavelength, e.g., from the near-infrared region, and is not necessarily limited to the visible spectrum. Devices of the invention can be formed using one, two or more wafers secured together. Various modifications of the described embodiments, as well as other embodiments of the invention, which are apparent to persons skilled in the art to which the invention pertains are deemed to lie within the principle and scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. Similarly, while many figures show the different structural layers as horizontal layers, such orientation is for descriptive purpose only and not to be construed as a limitation.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A device, comprising:
   a substrate;
   a first flexible beam connected between two anchors supported on the substrate; and
   a plate mechanically coupled to the first flexible beam and adapted to absorb incident radiation, wherein:
   the plate is adapted to transfer heat generated due to said absorption to the first flexible beam to cause the first flexible beam to deform and move the plate with respect to the substrate; and
   the first flexible beam and at least a portion of each of the two anchors have been formed from a common layer of material.

2. The invention of claim 1, wherein the incident radiation comprises infrared radiation.

3. The invention of claim 1, wherein at least a portion of the plate has been formed from said common layer of material.

4. The invention of claim 1, wherein:
   said common layer of material is a planar layer supported at an offset distance from the substrate; and
   certain portions of said planar layer have been removed to define the first flexible beam and the corresponding portions of the two anchors.

5. The invention of claim 4, wherein:
   a slot cut through said common layer defines a side of the first flexible beam and a side of a fastener that mechanically connects said two anchors; and
   a temperature difference between the first flexible beam and the fastener causes the first flexible beam to deform.

6. The invention of claim 1, further comprising a stationary electrode disposed on the substrate, wherein:
   the stationary electrode and the plate form a capacitor; and
   the motion of the plate produces a capacitance change for said capacitor indicative of an amount of incident radiation absorbed by the plate.

7. The invention of claim 1, further comprising a second flexible beam connected between two additional anchors supported on the substrate, wherein:
   the plate is mechanically coupled to the second beam and is adapted to transfer a portion of the heat to the second beam to cause the second beam to deform; and
   said motion of the plate is translation with respect to the substrate.

8. The invention of claim 7, wherein the second beam and at least a portion of each of the two additional anchors have been formed from said common layer of material.

9. The invention of claim 1, wherein said motion of the plate is rotation with respect to the substrate.

10. The invention of claim 9, further comprising:
    a torsion rod affixed to the substrate; and
    an extension of the plate that mechanically couples the plate to the torsion rod, wherein the first flexible beam is mechanically coupled to the extension so that the deformation of the first flexible beam causes the extension and the plate to rotate about a rotation axis defined by the torsion rod.

11. The invention of claim 1, wherein the first flexible beam has a length that is greater than a linear size of the plate.

12. The invention of claim 1, wherein the first flexible beam is subjected to a stress gradient to control a direction of the motion.

13. The invention of claim 12, wherein the first flexible beam is covered with an additional layer of material to cause a contact region between the common and additional layers to have said stress gradient.

14. The invention of claim 1, wherein:
the device is a part of an array having a plurality of such devices; and
the substrate is a common substrate for said plurality.

15. The invention of claim 14, wherein at least two devices of the plurality share at least one of the two anchors.

16. The invention of claim 14, wherein:
each device of the plurality comprises a fastener that mechanically connects the two anchors of the device; and
at least one of said fasteners is shared by two different devices of the plurality.

17. A method of detecting incident radiation, comprising:
exposing a plate to the incident radiation, wherein the plate is adapted to absorb at least a portion of said radiation;
transferring heat generated in the plate due to said absorption to a first flexible beam to cause the first flexible beam to deform and move the plate with respect to the substrate, wherein:
the first flexible beam is connected between two anchors supported on a substrate;
the plate is mechanically coupled to the first flexible beam; and
the first flexible beam and at least a portion of each of the two anchors have been formed from a common layer of material;
detecting said motion of the plate.

18. The invention of claim 17, wherein said motion comprises rotation or translation of the plate with respect to the substrate.

19. The invention of claim 17, wherein the step of detecting comprises detecting a capacitance change for a capacitor formed by the plate and a stationary electrode disposed on the substrate, wherein the motion of the plate produces said capacitance change.

20. The invention of claim 17, the step of detecting comprises:
reflecting an interrogating optical beam from the plate; and
detecting a phase shift or a propagation direction of the reflected beam.

* * * * *

UNITED STATES PATENT AND TRADEMARK OFFICE
CERTIFICATE OF CORRECTION

PATENT NO. : 7,842,923 B2  Page 1 of 1
APPLICATION NO. : 12/180866
DATED : November 30, 2010
INVENTOR(S) : Dennis S. Greywall It is certified that error appears in the above-identified patent and that said Letters Patent is hereby corrected as shown below:

On Page 2
At "Other Publications", insert —

--"Optomechanical Uncooled Infrared Imaging System: Design, Microfabrication, and Performance," by Yang Zhao et al., Journal of Microelectromechanical Systems, Vol. 11, No. 2, April 2002, pp. 136-146.--

--"High Sensitivity Uncooled Microcantilever Infrared Imaging Arrays," by Scott R. Hunter et al., Presented at the SPIE Defense and Security Symposium, April 19, 2006, Infrared Technology and Applications XXXII, Vol. 6206, pp. 1-12.--

Signed and Sealed this
Eighth Day of February, 2011

David J. Kappos
*Director of the United States Patent and Trademark Office*